United States Patent [19]

Okada

[11] Patent Number: 5,031,403
[45] Date of Patent: Jul. 16, 1991

[54] AXLE DRIVING APPARATUS

[75] Inventor: Hideaki Okada, Takarazuka, Japan

[73] Assignee: Kanzaki Kokyukoki Mfg. Co. Ltd., Amagasaki, Japan

[21] Appl. No.: 413,763

[22] Filed: Sep. 28, 1989

[30] Foreign Application Priority Data

| Oct. 7, 1988 | [JP] | Japan | 63-132060[U] |
| Oct. 14, 1988 | [JP] | Japan | 63-134701[U] |
| Oct. 14, 1988 | [JP] | Japan | 63-134702[U] |

[51] Int. Cl.⁵ ............................................. F16D 31/02
[52] U.S. Cl. ........................................ 60/464; 60/487; 74/606 R; 91/505
[58] Field of Search ............... 60/464, 487, 488, 489, 60/490; 91/505; 74/606 R

[56] References Cited

U.S. PATENT DOCUMENTS

| 3,196,696 | 7/1965 | Ritter | 74/15.63 |
| 4,691,802 | 9/1987 | Ishimori et al. | 180/291 |
| 4,857,264 | 8/1989 | Nishimura et al. | 60/490 |

FOREIGN PATENT DOCUMENTS

| 49-10698 | 3/1974 | Japan . |
| 52-27345 | 6/1977 | Japan . |
| 56-8735 | 2/1981 | Japan . |
| 60-51351 | 4/1985 | Japan . |
| 61-48661 | 3/1986 | Japan . |
| 61-134433 | 8/1986 | Japan . |
| 63-16630 | 4/1988 | Japan . |

*Primary Examiner*—Ronald C. Capossela
*Attorney, Agent, or Firm*—Sterne, Kessler, Goldstein & Fox

[57] ABSTRACT

In order that a hydraulic pump and a hydraulic motor of a hydrostatic transmission hitherto disposed to the exterior are attached to a hydrostatic transmission support member provided in a mission case, a charging pump hitherto attached to the hydraulic pump at the hydrostatic transmission is also attached to the hydrostatic transmission support member, and an oil filter hitherto attached to the outside of mission case is disposed therein, they are interposed between the lower surface of hydrostatic transmission support member and the charging pump. Furthermore, an outward takeout pump also is supported in the mission case.

15 Claims, 11 Drawing Sheets

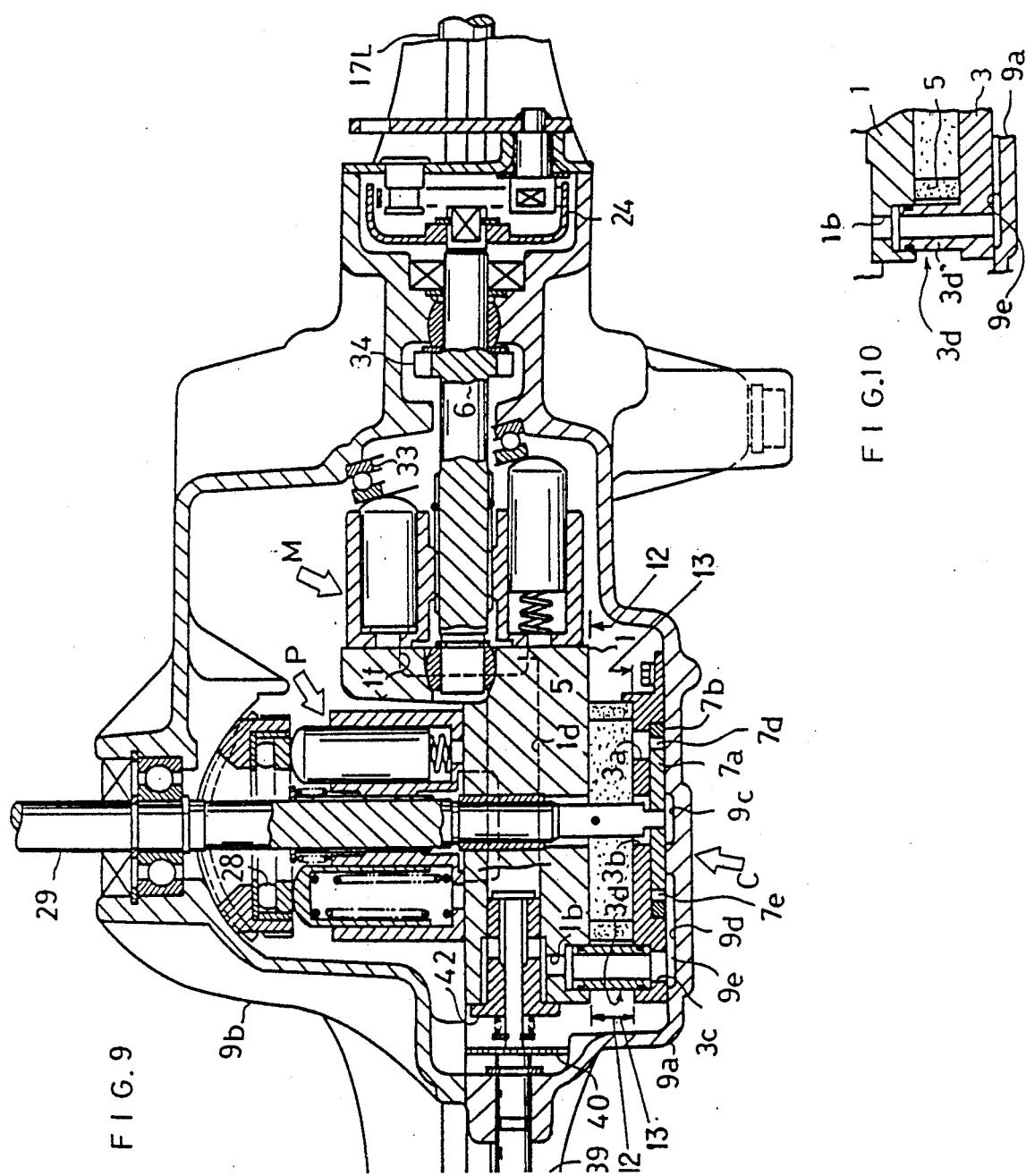

AXLE DRIVING APPARATUS

FIELD OF THE INVENTION

The present invention relates to an axle driving apparatus housing therein a hydrostatic-transmission (HST) used as a driving apparatus for a light running vehicle or the like.

DESCRIPTION OF THE PRIOR ART

Conventionally, for an axle driving apparatus with a hydrostatic-transmission (HST), the following technique has been well known as to a hydrostatic transmission support member or a charging pump:

U.S. Pat. Nos. 4,691,802 and 3,196,696, Japanese Utility Model Publication No. Sho 52-27345, Japanese Utility Model Laid-Open No. Sho 61-134433, Japanese Utility Model Publication No. Sho 56-8735, Japanese Utility Model Laid-Open No. Sho 60-51351, Japanese Patent Laid-Open No. Sho 61-48661, Japanese Utility Model Publication No. Sho 49-10698, and Japanese Patent Publication No. Sho 63-16630 disclose the following technique respectively.

SUMMARY OF THE INVENTION

The axle driving apparatus of the present invention attaches to a hydrostatic transmission support member provided in a transmission case a hydraulic pump and a hydraulic motor for the hydrostatic transmission which have hitherto have been disposed outside the axle driving apparatus; attaches a charging pump to the lower surface of the hydrostatic transmission support member; and also disposes an oil filter within the axle driving apparatus, so that suction oil passages for the charging pump are interposed, in condition of communicating with each other, under the hydrostatic transmission support member. Also, an outward takeout pump is supported within the transmission case.

BRIEF DESCRIPTION OF THE DRAWINGS

FIG. 9 is a sectional front view of a second embodiment of the present invention, FIG. 10 is a partial sectional front view of another modified embodiment of the present invention, in which the discharge oil passage is modified.

DESCRIPTION OF THE PREFERRED EMBODIMENT

Next, one embodiment of the axle driving apparatus of the present invention will be described in accordance with the accompanying drawings.

Figure 1:
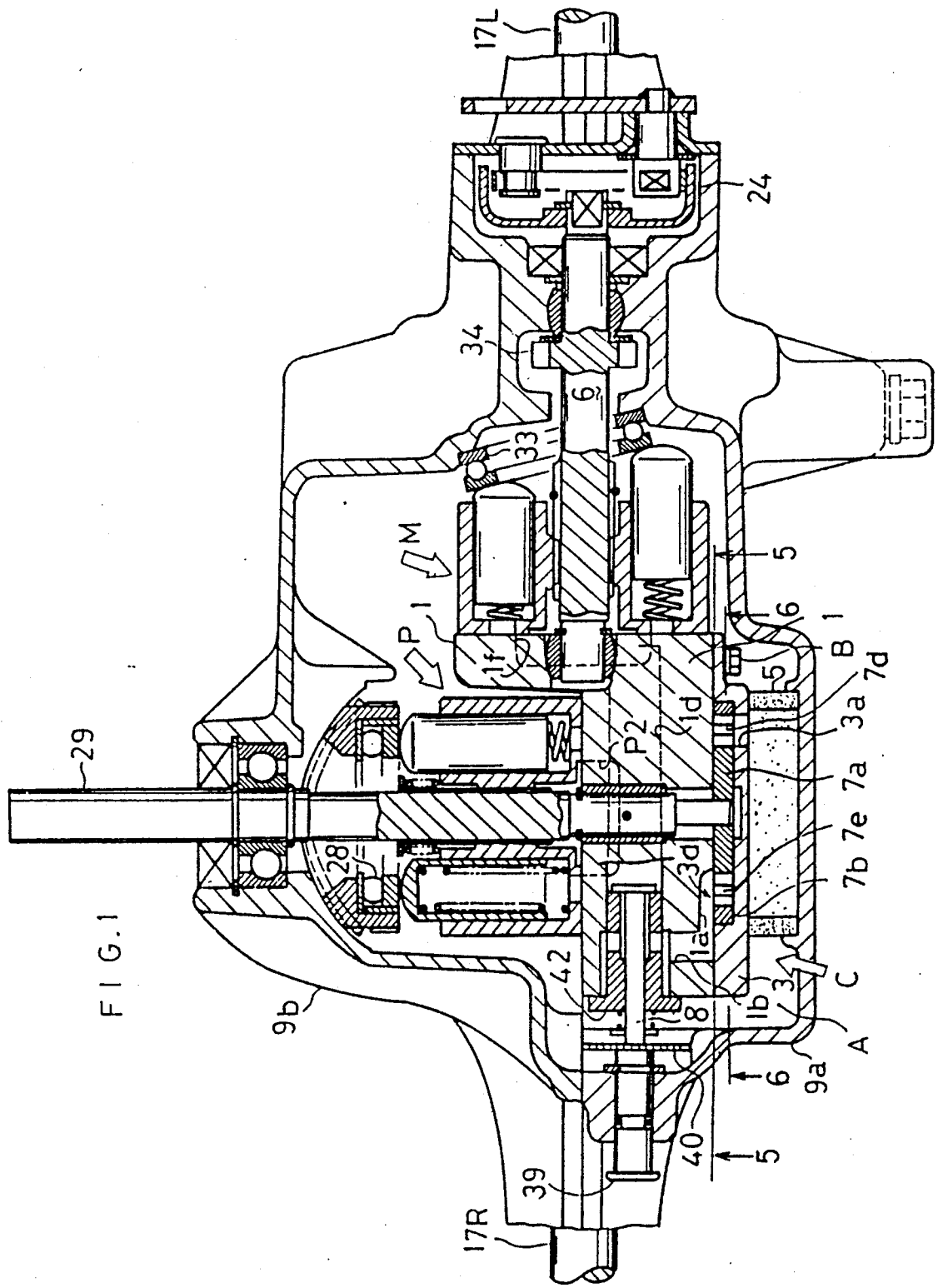
FIG. 1 is a sectional front view of an embodiment of an axle driving apparatus of the invention.
Figure 2:
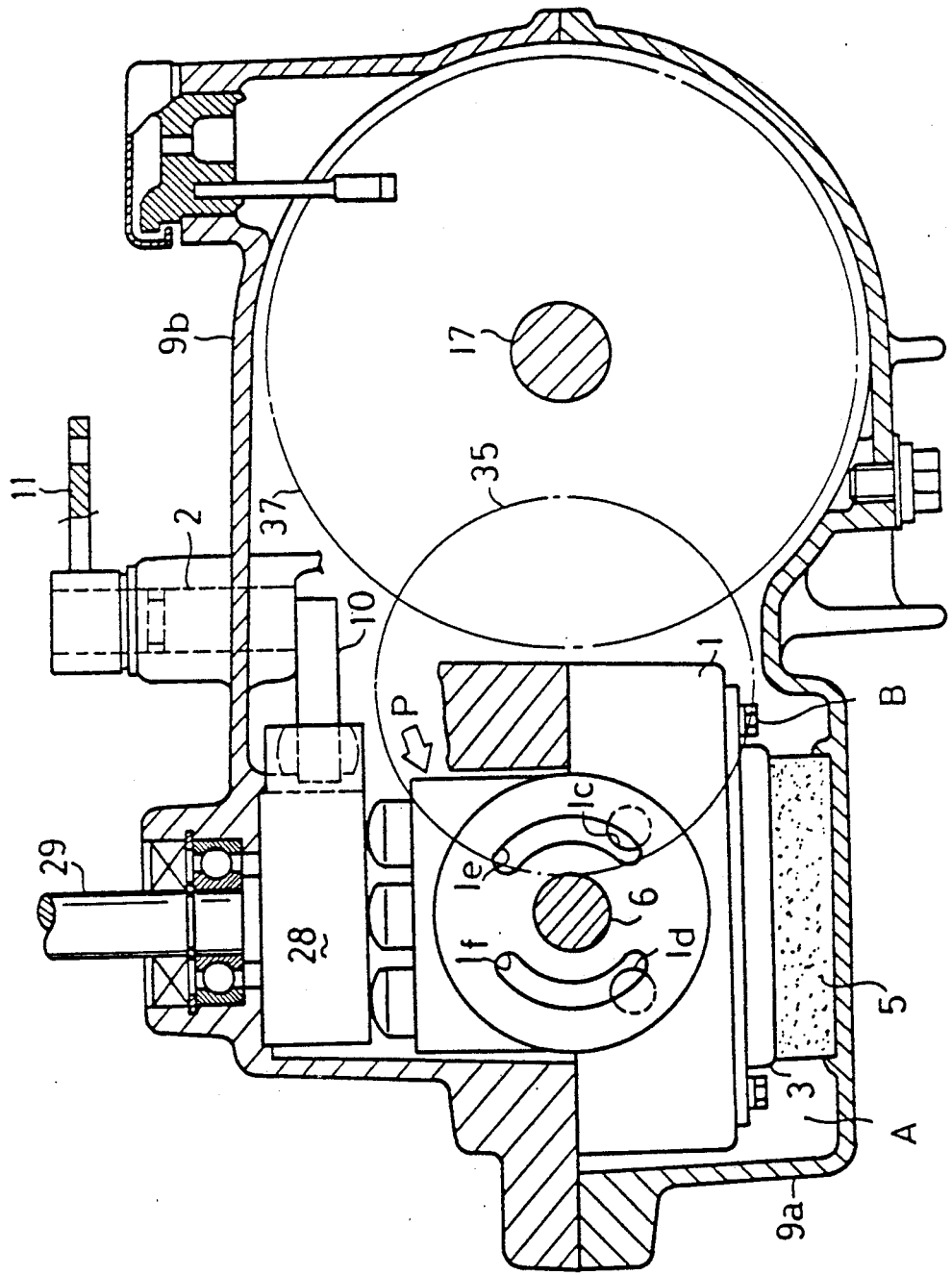
FIG. 2 is a sectional right side view of the same.
Figure 3:
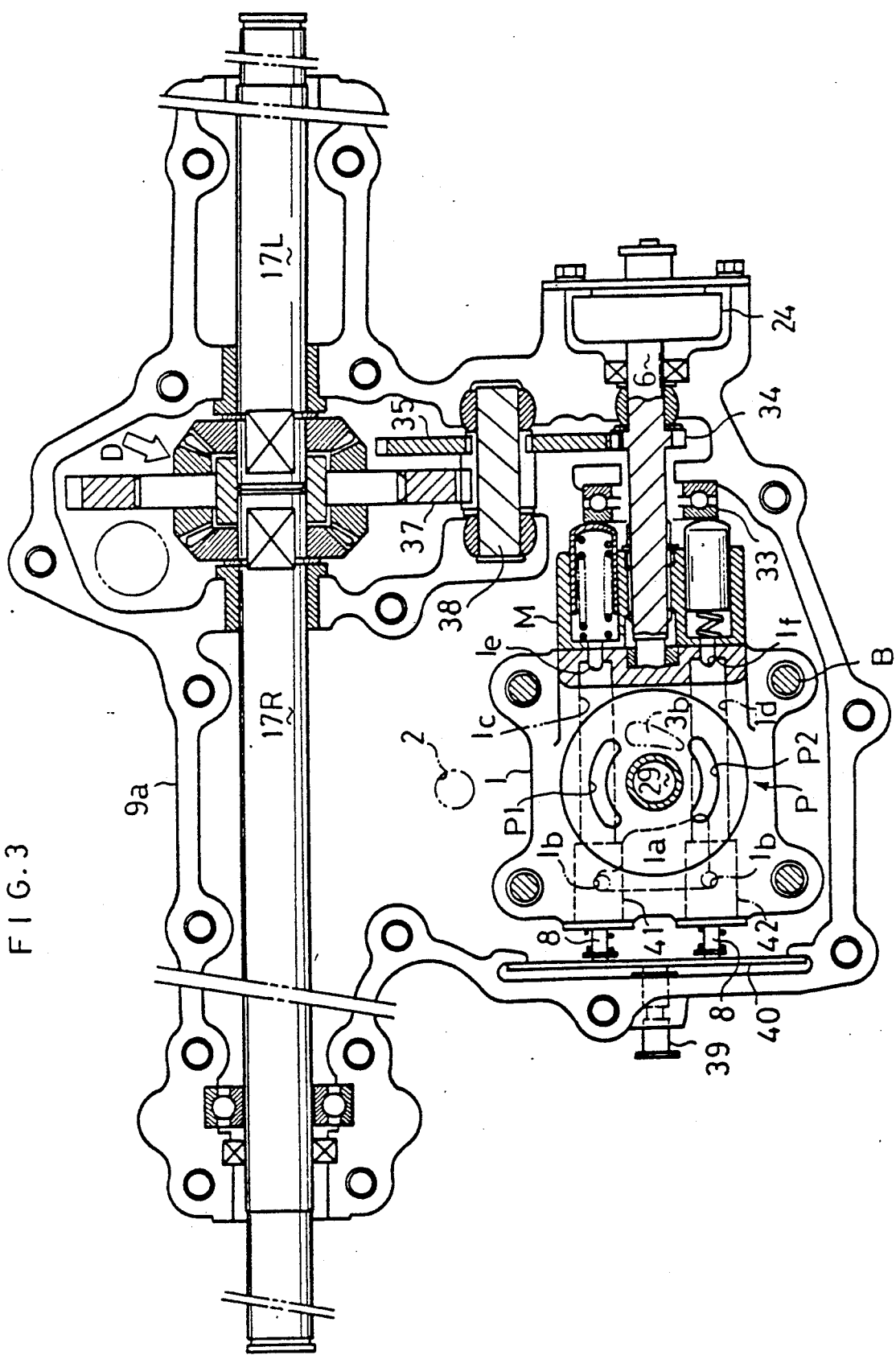
FIG. 3 is a plan view of the same, from which an upper transmission case part 9b is removed.

In FIGS. 1, 2 and 3, a hydraulic pump P and a hydraulic motor M for a hydrostatic transmission in a mission or transmission case 9, a hydrostatic transmission support member 1 for supporting the hydraulic pump P and hydraulic motor M, and a charging pump C attached to the hydrostatic transmission support member 1 are shown and arrangement thereof will be described.

An upper mission or transmission case 9b and a lower mission or transmission case 9a are vertically connected by connecting bolts to form one mission case 9.

At the mating faces of the lower mission case 9a and upper mission case 9b are formed bearing faces for a hydraulic motor shaft 6, a countershaft 38 and axles 17L and 17R.

The hydrostatic transmission support member 1, which is preferably L-shaped, is connected to the mating face of the upper mission case 9b through four bolts B. Between the lower surface of the hydrostatic transmission support member 1 and the inner bottom surface of the lower mission case 9a is formed a space A for disposing therein a charging pump C to be discussed below and an outward takeout pump T. At the upper flat surface of the hydrostatic transmission support member 1 is fixed an axial piston type hydraulic pump P for the hydrostatic transmission and at the left side surface of a rising portion provided at the hydrostatic transmission support member 1 is fixed a hydraulic motor M of the same type as the hydraulic pump P. Thus, pump P is disposed perpendicular to Motor M.

Figure 4:
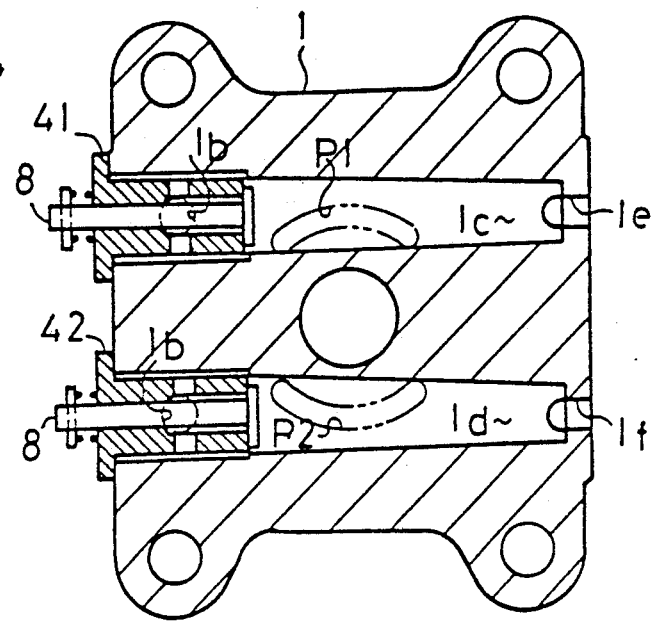
FIG. 4 is a sectional plan view of a hydrostatic transmission support member.

A closed circuit connecting the hydraulic pump P and hydraulic motor M for the hydrostatic transmission comprises crescent-shaped oil passages P1 and P2 open at the upper flat surface of hydrostatic transmission support member 1, and 1e and 1f also of crescent-shape open at the right side surface of the rising portion (FIGS. 2 and 4), and two oil passages 1c and 1d communicating with these passages P1, P2 and 1e, 1f respectively (FIG. 4).

A hydraulic pump shaft 29 perforates the upper mission case 9b so as to upwardly project and a movable swash plate 28 is disposed between the spherical wall of upper mission case 9b and the upper surface of hydraulic pump P.

An operational engaging portion projects laterally of the movable swash plate 28 and engages with a lever arm 10 (FIG. 2).

The lever arm 10 is fixed to a speed-change lever shaft 2 and a speed-change arm 11 is fixed thereto at the position where the speed-change lever shaft 2 perforates the upper wall of upper mission case 9b and projects upwardly therefrom.

The movable swash plate 28 is rotated by the lever arm 10 so as to change the angle of swash plate 28, thereby changing the discharge direction and a discharge amount of pressure oil from the hydraulic pump P.

Also, the lower end of hydraulic pump shaft 29 perforates the horizontal part of hydrostatic transmission support member 1 to enter the space A and fixedly supports a pump gear 7 of the charging pump C attached to the lower surface of hydrostatic transmission support member 1. Pump P freely rotates on pump shaft 29.

The charging pump C comprises the pump gear 7 covered by a charging pump case 3 attached to a lower surface of support member 1. Pump gear 7 rotates to pressurize, as operating oil, lubricating oil taken into the case 3 through an oil filter 5 so that the pressurized lubricating oil is supplied from a charge oil passage 1a to vertical oil passages 1b.

Figure 6:
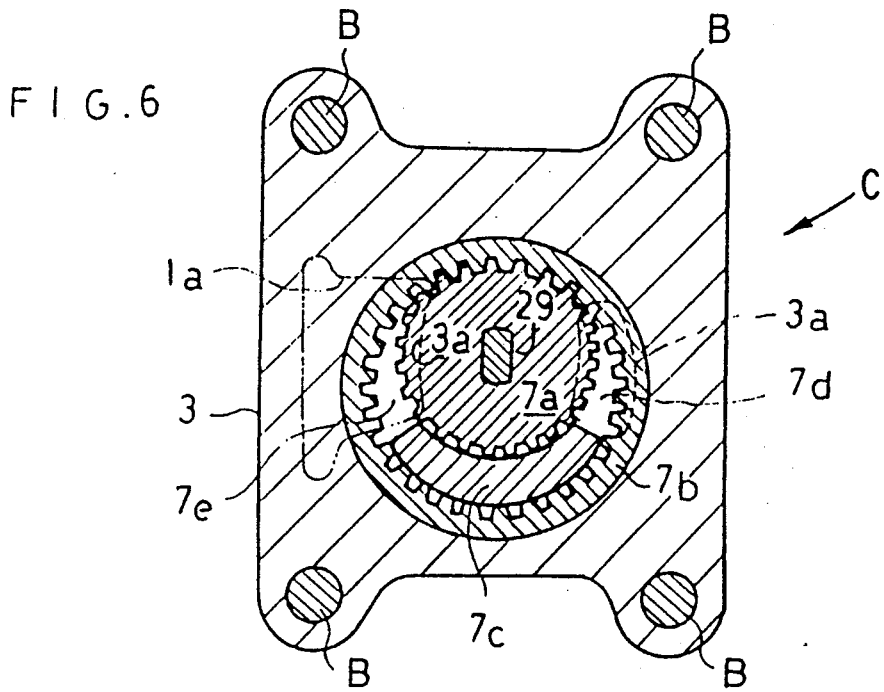
FIG. 6 is a sectional view taken on the line 6—6 in FIG. 1.

The pump gear 7, as shown in FIG. 6, comprises an internal gear pump of an internal gear 7b and an external gear 7a, the hydraulic pump shaft 29 being fixed at the center of external gear 7a. A crescent shaped shutter 7c within internal gears 7b, and engages both gears 7a and 7b, creating two non-engaged spaces 7d and 7e. Lower pressure port 7d communicates with suction oil passage 3a in order to suck operating oil. Higher pressure port 7e communicates with charge oil passage 1a of support member 1.

Check valve seats 41 and 42 communicating with the vertical oil passages 1b respectively are disposed so as to form check valves 8 for supplying pressure oil from the oil passages 1b to the oil passages 1c and 1d between the hydraulic pump P and the hydraulic motor M in a closed circuit.

The check valves 8 can be open by oil pressure from the oil passages 1b, or mechanically as follows: The check valves 8 project at operating ends from the side surface of hydrostatic transmission support member 1 and a spring-loaded connecting rod 40 connects and urges against the projections of the two check valves 8, a push pin 39 for pushing the connecting rod 40 projects outwardly from the lower mission case 9a.

The push pin is pushed to simultaneously open the check valves 8 so that the oil passages 1c and 1d communicate with each other through the vertical oil passages 1b and charge oil passage 1a so as to short-circuit the closed circuit, thereby stopping rotation of the hydraulic motor M.

Figure 7:
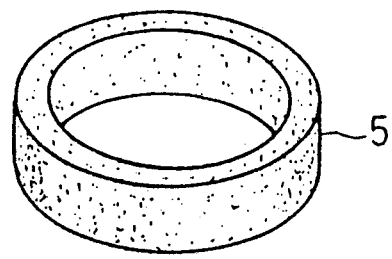
FIG. 7 is a perspective view of an oil filter.

Furthermore, the charging pump C is attached to the lower surface of hydrostatic transmission support member 1 and between the charging pump case 3 of charging pump C and the inner surface of lower mission case 9a is interposed a cylindrical oil filter 5 composed of porous material, such as sponge, as shown in FIG. 7.

In order to simplify fixing the unit, the oil filter 5 is not tightened by bolts, but is sandwiched between the charging pump case 3 and the inner surface of the lower mission case 9a.

The hydraulic motor M fixed to the rising portion of hydrostatic transmission support member 1 obtains torque of the hydraulic motor shaft 6 by allowing pistons of the motor M to abut against a fixed swash plate 33. An output gear 34 is fixed to an intermediate portion of hydraulic motor shaft 6, and a braking drum 24 of a brake system is fixed to the outer end of the same. Motor M freely rotates on motor shaft 6.

As shown in FIG. 3, the output gear 34 fixed to the hydraulic motor shaft 6 engages with a larger diameter gear 35 on the counter shaft 38 and a smaller diameter gear 37 thereon engages with a ring gear at a differential gear D.

Figure 5:
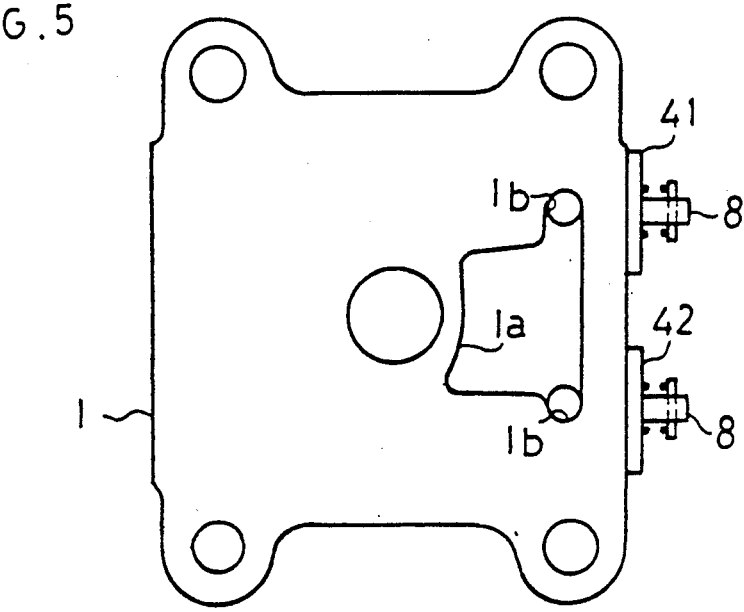
FIG. 5 is a sectional view taken on the line 5—5 in FIG. 1.

FIG. 5 is a bottom view of the hydrostatic transmission support member 1, the charging pump case 3 containing therein the pump gear 7 as in FIG. 6.

Operating oil for the charging pump C comprising the pump gear 7 and charging pump case 3 is taken in by a suction oil passage 3a open at the lower surface of charging pump case 3, the oil filter 5, composed of cylindrical sponge, is tightly closed around the suction oil passage 3a.

The pressure oil discharged through the pump gear 7 is guided from the discharge oil passage 3d to the charge oil passage 1a at the hydrostatic transmission support member 1.

Then, the pressure oil is sent from the charge oil passage 1a to inlets of check valves 8 at the check valve seats 41 and 42 through the vertical oil passages 1b.

Usually, during running, high pressure oil is supplied to the oil passages P1, 1c and 1e or to P2, 1d and 1f, comprising the closed circuit between the hydraulic pump P and the hydraulic motor M. Assuming that the high pressure oil is applied to the oil passages P1, 1c and 1e, the pressure oil generated by the charging pump C is lower in oil pressure than the high pressure oil, whereby the check valve 8 is closed with respect to the check valve seat 41. Hence, the pressure oil from the charging pump C does not flow to the oil passages P1, 1c and 1e.

Conversely, when the operating oil in the oil passages P2, 1d and 1f subjected to a decreased in pressure due to leakage from the hydraulic pump P or the hydraulic motor M and the oil pressure becomes lower than that of charging pump C, the pressure at the charging pump C side pushes open the check valve 8 applied with no pressure, thereby supplying the operating oil into the closed circuit of oil passages P2, 1d and 1f.

Figure 8:
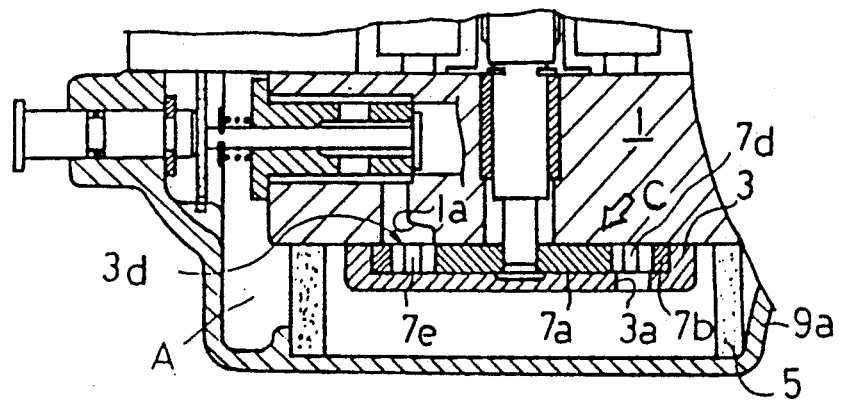
FIG. 8 is a sectional front view in part of a modified embodiment of the present invention, in which the oil filter is disposed in a different position.

In the modified embodiment in FIG. 8, a small-sized charging pump C is attached to the bottom surface of hydrostatic transmission support member 1 and the charging pump case 3 also is small-sized, so that the cylindrical oil filter 5 is interposed outside the charging pump case 3 and between the inner bottom surface of lower mission case 9a and the bottom surface of HST support member 1.

Next, explanation will be given on the second embodiments in FIGS. 9, 10, 11 and 12.

A hydraulic pump shaft 29 perforates the hydrostatic transmission support member 1 and projects downwardly from the lower surface thereof, passes through the oil filter 5, perforates a shaft bore 3b at the charging pump case 3 attached to the inner bottom surface of the lower mission case 9a, and engages rotatably with the external gear 7a of the pump gear 7.

Figure 13:
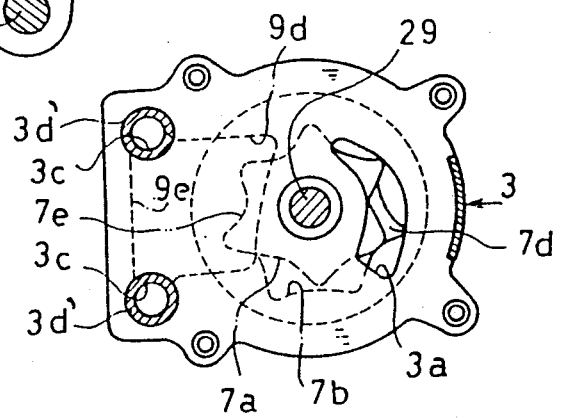
FIG. 13 is a sectional view taken along line 13—13 in FIG. 9.

The pump gear 7, as shown in FIG. 13, comprises an internal trochoid gear of an internal gear 7b and of an external gear 7a, the hydraulic pump shaft 29 being fixed to the center thereof.

The charging pump C comprises the pump gear 7 covered by a charging pump case 3, so that the pump gear 7 rotates to pressurize, as operating oil, the lubricating oil taken in from the oil filter 5 through the suction oil passage 3a. Pressurized operating oil is supplied to the vertical oil passages 1b of the hydrostatic transmission support member 1.

The check valve seats 41 and 42 are disposed to communicate with the vertical oil passages 1b so that in the check valve seats 41 and 42 are formed check valves 8 for supplying pressure oil from the charging pump C to the closed circuit between the hydraulic pump P and the hydraulic motor M.

The check valves 8 project from one side surface of hydrostatic transmission support member and the connecting rod 40 connects the projections of the two left and right check valves 8. The push pin 39 for pushing the connecting rod 40 projects from the lower mission case 9a.

The push pin 39 is pushed to open both the check valves 8, whereby the discharge side and return side of the hydraulic pump P short-circuit to stop the rotation of hydraulic motor M.

At the upper surface of the charging pump case 3 is open the suction oil passage 3a, around which the oil filter 5 of cylindrical sponge is disposed.

The operating oil taken in from the suction oil passage 3a is discharged to part of the discharge oil passage 9d.

The discharge oil passage 9d is recessed in the inner bottom surface of the lower mission case 9a, and an oil passage 9e is provided in extension of the discharge oil passage 9d. The oil passage 9e communicates with a higher pressure port 7e and the vertical oil passage 3c, which communicates with the discharge oil passage 3d at a rising portion of the L-like shape of the charging pump case 3.

The discharge oil passage 3d communicates with vertical oil passage 1b at the hydrostatic transmission support member 1.

Alternatively, the cylindrical and separate oil passage 3d, as shown in FIG. 9, may be a cylindrical separate passage fitted into the case, as shown in the modified embodiment of FIG. 10 in which, the charging pump case 3 is if an L-like shaped and an integral discharge oil passage 3d is be bored therethrough.

Figure 11:
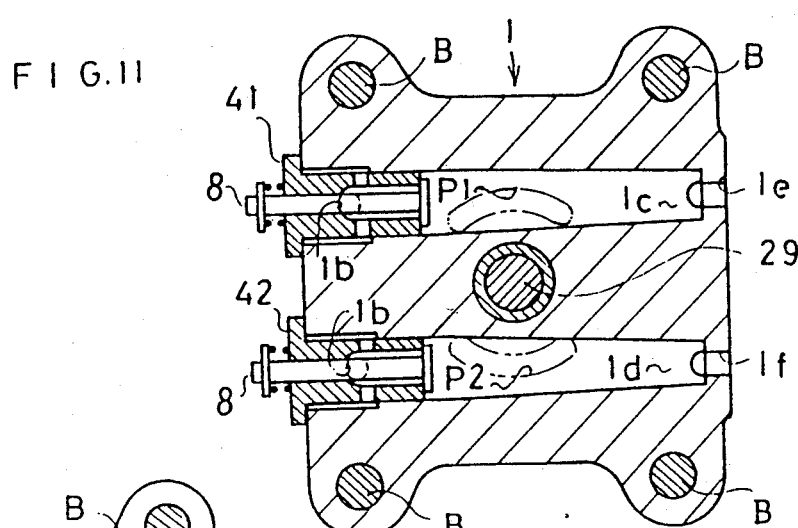
FIG. 11 is a sectional plan view of the hydrostatic transmission support member of FIG. 9.
Figure 12:
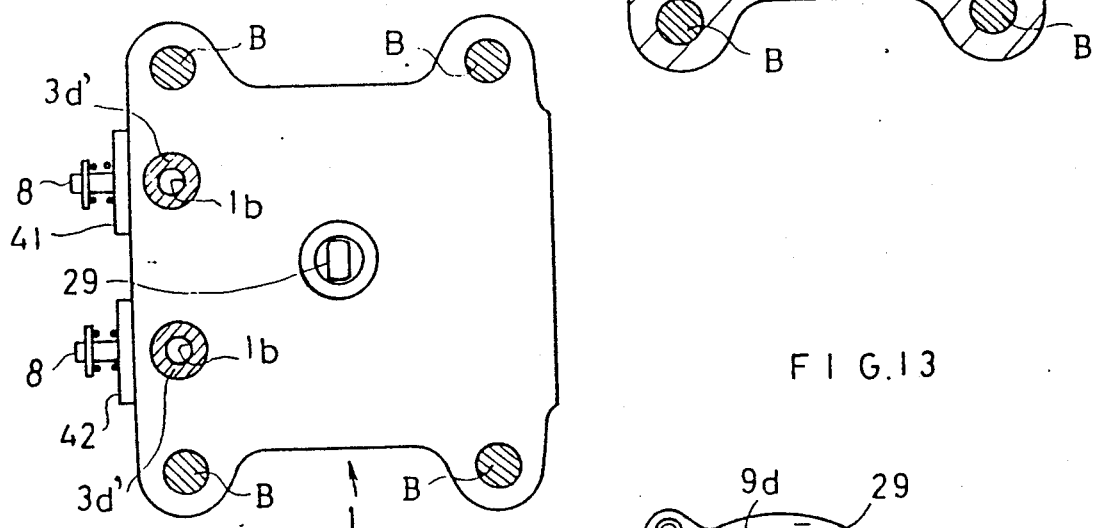
FIG. 12 is a sectional view of the hydrostatic transmission support member taken on line 12—12 in FIG. 9.

FIG. 11 is a sectional view of the hydrostatic transmission support member 1, FIG. 12 is a bottom view thereof, and the discharge oil passage 3d is interposed between the bores of vertical oil passages 1b at the hydrostatic transmission support member 1 and the bores of vertical oil passage 3c at the charge pump case 3.

The pressure oil discharged from the charging pump C is fed from the discharge oil passage 3d to inlets of check valves 8 at the check valve seats 41 and 42 through the vertical oil passages 1b at the hydrostatic transmission support member.

Next, explanation will be given on the third embodiment in FIG. 14.

Figure 14:
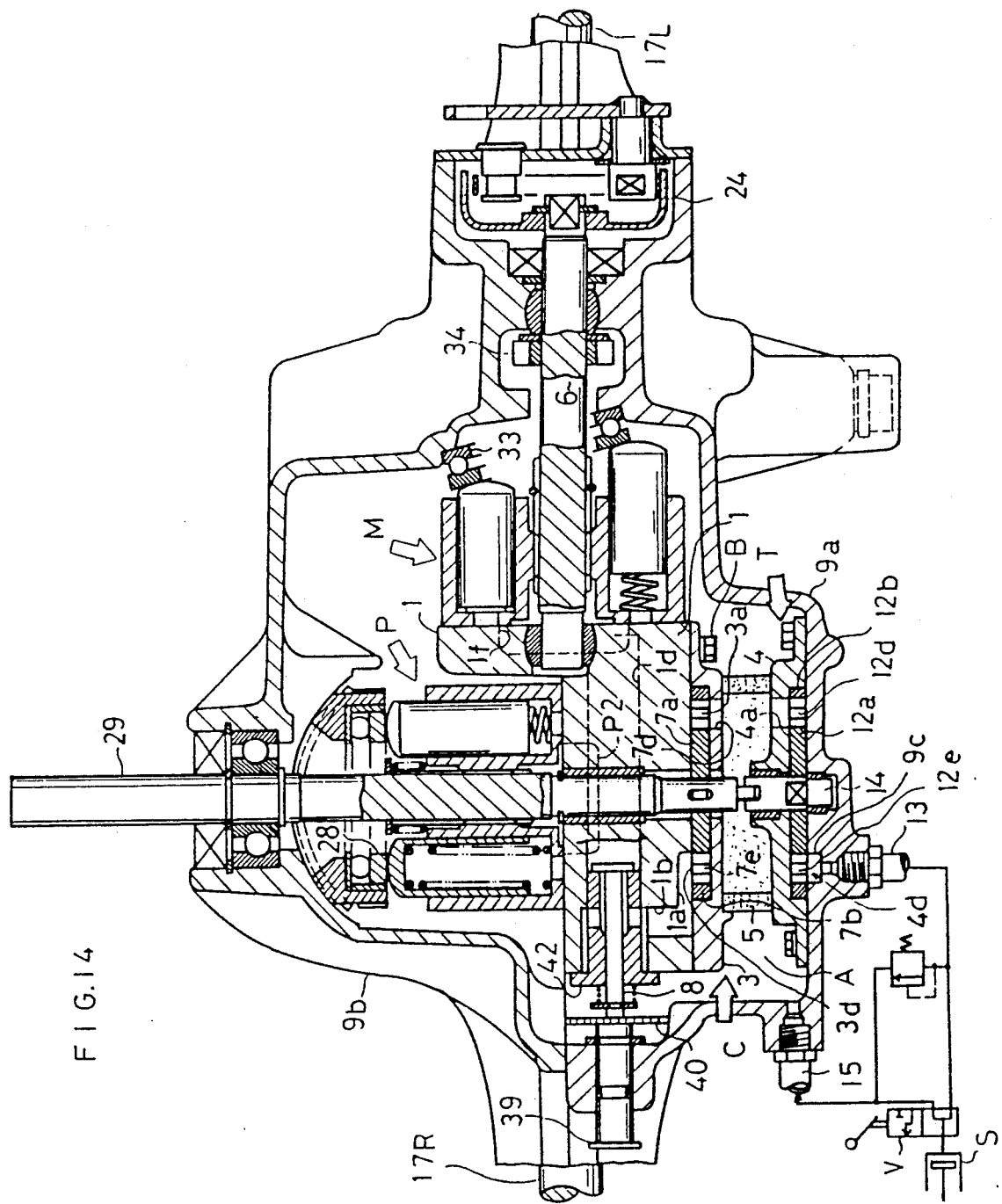
FIG. 14 is a sectional front view of a third embodiment of the present invention.

The embodiment in FIG. 14 is the same as the former embodiment in that the charging pump C is attached to the bottom surface of hydrostatic transmission support member 1, but the hydraulic pump shaft 29 perforates the charging pump case 3 and projects therefrom so that at the position where the hydraulic pump shaft 29 projects from the charging pump case 3 is detachably mounted a takeout pump T.

The takeout pump shaft 14 is separate from the hydraulic pump shaft 29 so as to be removable when the outward takeout pump T is not required.

The takeout pump is similar to charging pump C and includes a takeout pump shaft 14 supported to a bearing provided at the bottom of the lower mission case 9a and a takeout pump gear 12 for the outward takeout pump fixed to the pump shaft 14. Takeout pump gear 12, similar to charging pump gear 7, includes an external gear 12a and an internal gear 12b and a crescent shaped shutter (not shown) which creates two non-engaged spaces lower pressure port 12 and higher pressure port 12e. Port 12d communicates with suction oil passage 4a of outward takeout pump case 4 to suck operating oil in the mission case 9. Oil filter 5 covers both charging pump suction oil passage 3a and takeout pump suction oil passage 4a.

The pump gear 7 and a pump gear 12 in the drawing are formed as an internal gear pump, however, the invention is not limited to such construction.

A suction oil passage 4a is open at part of an outward takeout pump case 4, so that the operating oil filtrated and taken in the oil filter 5 is guided by the suction oil passage 4a into the outward takeout pump T and, after being high pressurized, the operating oil is discharged through the discharge pipe 13.

The discharge pipe 13 is charged over in the vertical direction by a directional control valve V and the operating oil is supplied to a lift cylinder S or the like at a mower R, for example.

Return oil from the directional control valve V and lift cylinder S is adapted to return into the mission case 9 through a return pipe 15.

Figure 15:
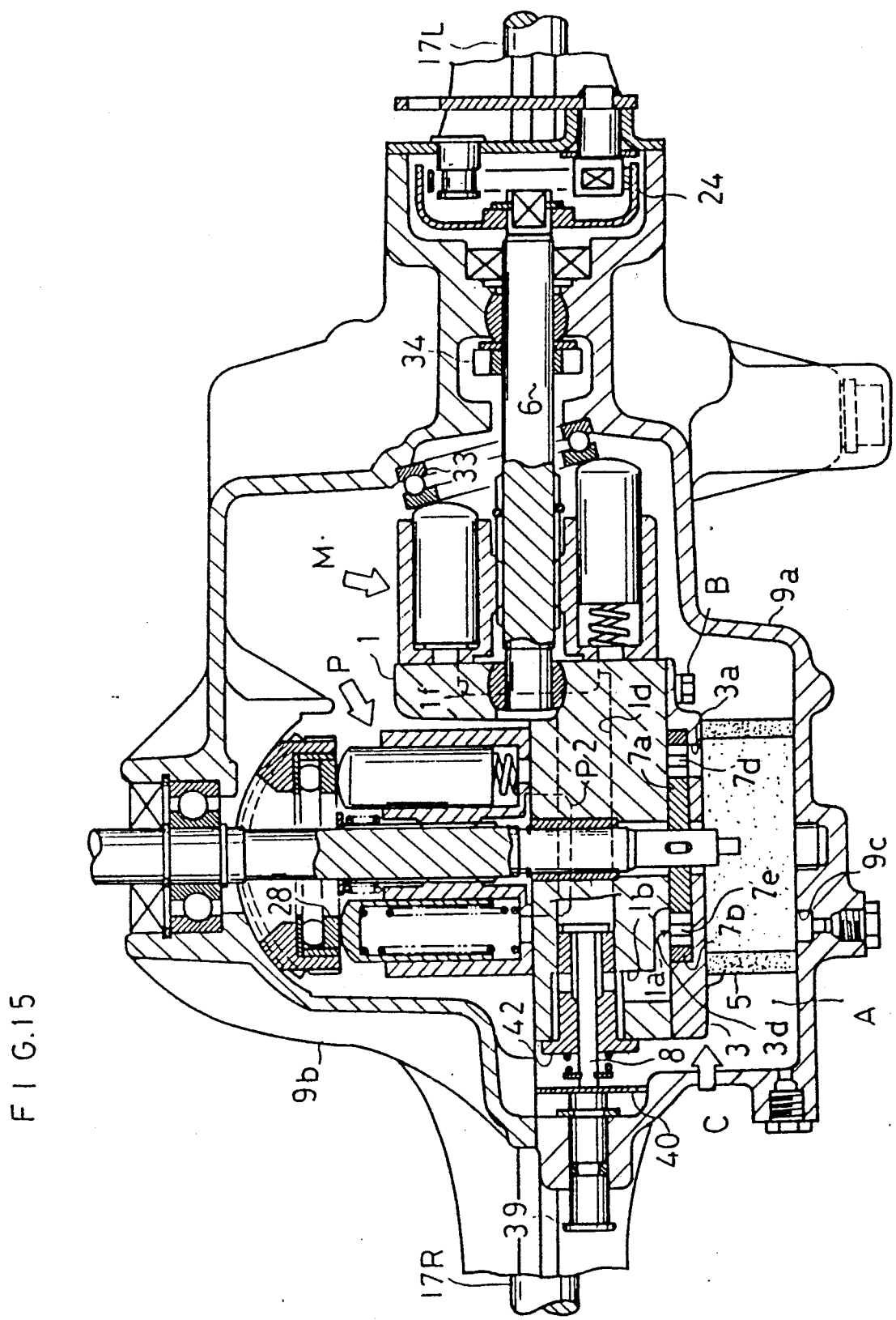
FIG. 15 is a sectional front of a still further modified embodiment of the axle driving apparatus in FIG. 14, from which the outward takeout pump is removed.

In the further modified embodiment in FIG. 15, the outward takeout pump T attached to the inner bottom surface of lower mission case 9a in FIG. 14 is removed therefrom and only the charging pump C is attached to the bottom surface of hydrostatic transmission support member 1.

Figure 16:
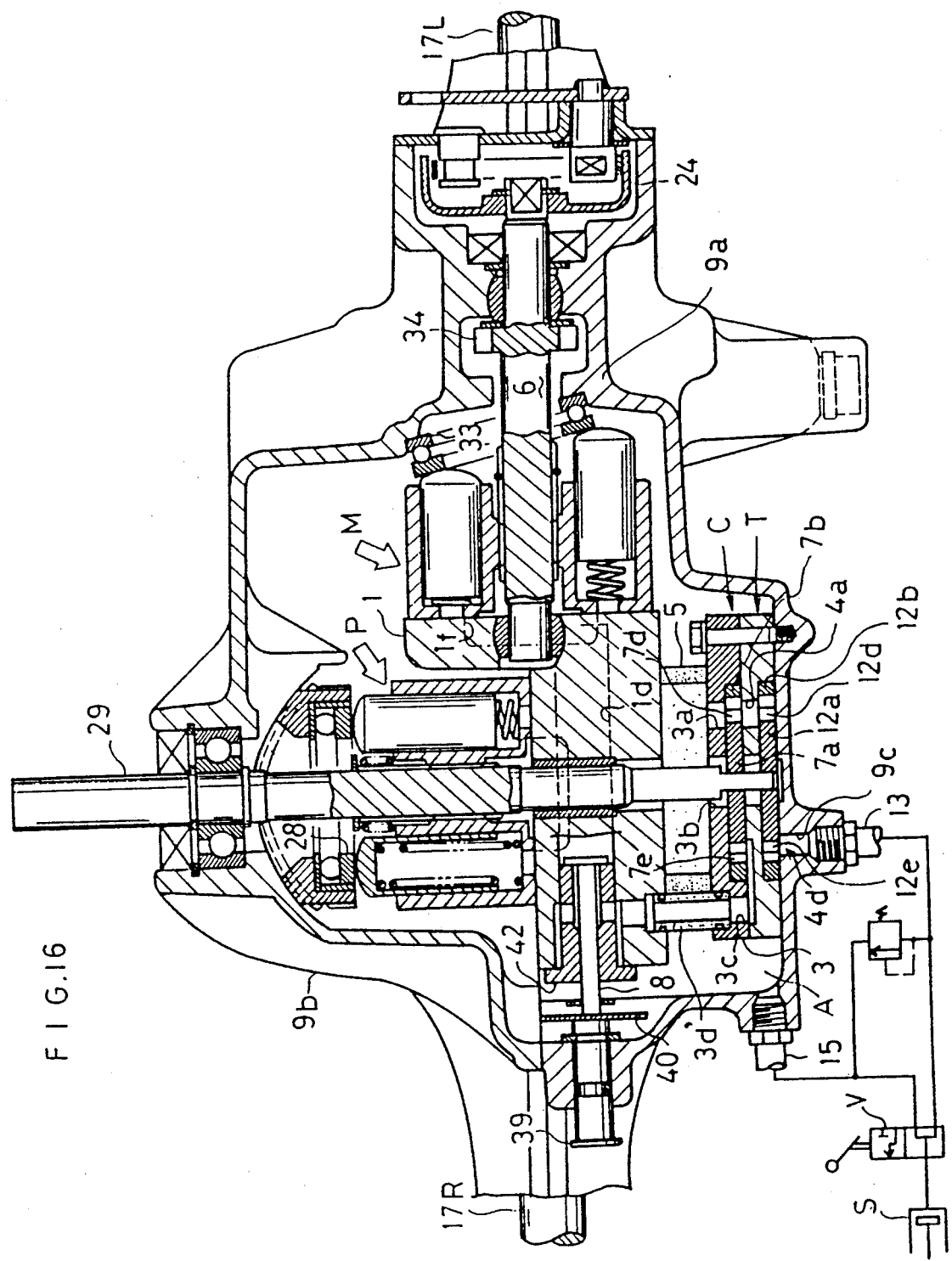
FIG. 16 is a sectional front view of a fourth embodiment of the present invention.

In FIG. 16, a fourth embodiment is shown in which onto the inner bottom surface of the lower mission case 9a is attached an outward takeout pump case 4 for the outward takeout pump T and a charging pump case 3 further is attached to the upper surface of outward takeout pump case 4.

In this embodiment, both the outward takeout pump T and charging pump C (similar to FIG. 9) are fixed to the inner bottom surface of lower mission case 9a.

In this embodiment, an oil filter 5 is interposed between the bottom surface of hydrostatic transmission support member 1 and the upper surface of charging pump case 3. Takeout pump suction oil passage 4a communicates with charging pump suctional passage 3a. However, oil filter 5 covers only the charging pump suction oil passage 3a. Filtered operating oil is sucked to takeout pump suction oil passage through charging pump suction oil passage 3a. Higher pressure port 12e opens to the inner bottom surface of the mission case 9 at outward takeout port 9c.

Figure 17:
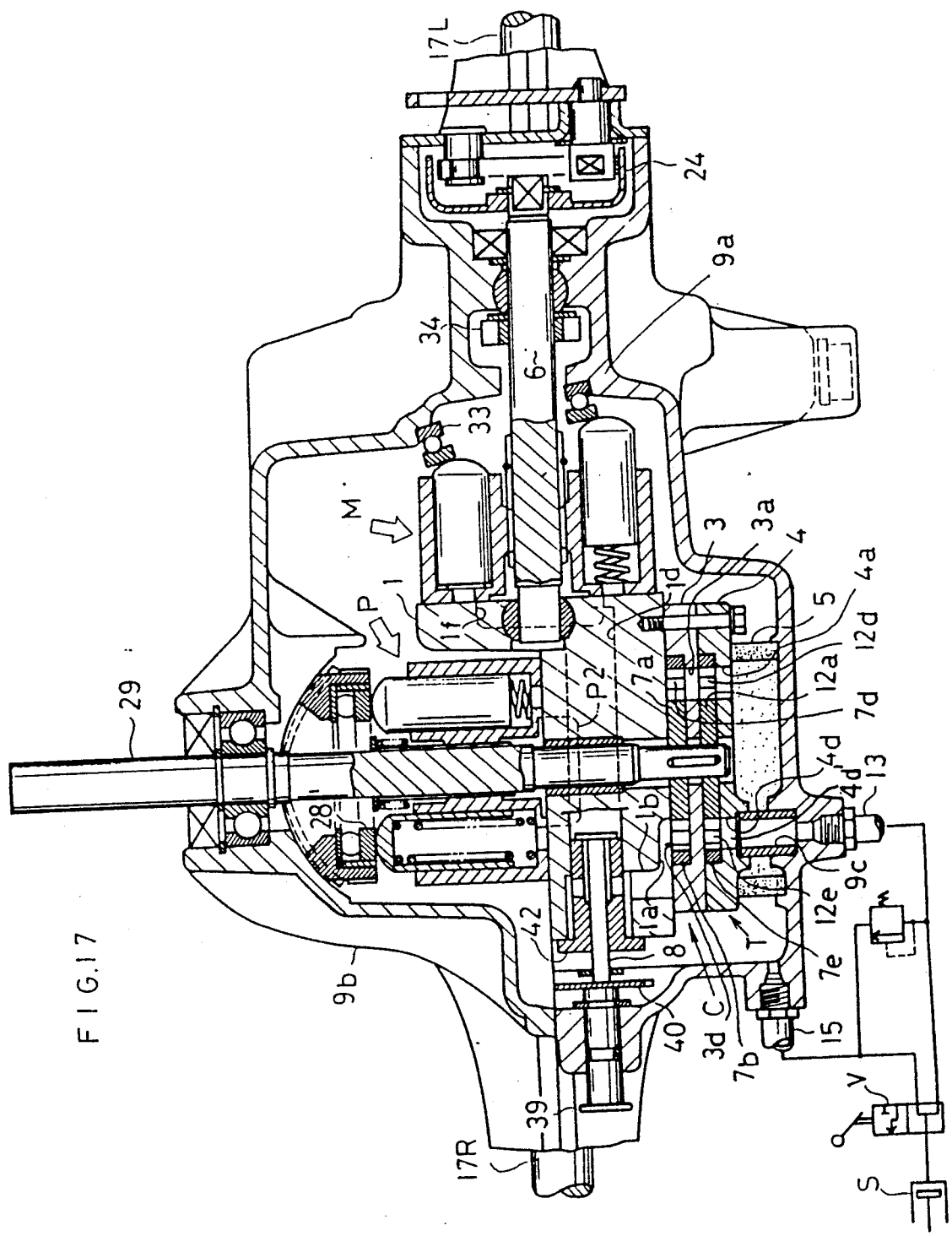
FIG. 17 is a sectional front view of a embodiment of the present invention.

In FIG. 17, a fifth embodiment is shown in which a charging pump case 3 of a charging pump C is fixed to the bottom surface of hydrostatic transmission support member 1 and an outward takeout pump case 4 of the outward takeout pump T is attached to the lower surface of the charging pump case 3. Pressure oil is discharged from the outward takeout pump T to a discharge pipe 13 through a discharge oil passage 4d″ and thereafter the return oil returns into the mission case 9 through a return pipe 15. A separate, cylindrical passage 4d is inserted into passage 4d″ between the inner bottom surface of mission case 9, and at takeout port 9c.

An oil filter 5 is interposed between the lower surface of the outward takeout pump case 4 and the inner bottom surface of lower mission case 9a covering only charging pump suction oil passage 3a. Filtered operating oil is sucked to oil passage 3a through takeout pump suction oil passage 4a.

The axle driving apparatus of the present invention constructed according to the above-mentioned embodiments is advantageous as follows:

In the space A formed between the hydrostatic transmission support member and the lower mission case, the hydrostatic transmission support member serves as a baffle plate, so that, even when the vehicle body swings, the lubricating oil stays in the space A in a condition which is difficult to create air bubbles, which can cause a malfunction, such as cavitation, of the charging pump.

Since the charging pump is immersed in the lubricating oil, the lubricating oil cleaned by the filter is directly taken into the charging pump and not through pipings or the like, whereby there is little likelihood of line resistance and the suction efficiency is improved.

Also, since oil leaked from the charging pump can be returned directly to the space A, it is not required that the pump case be precisely tightly closed, for example, by using an O-ring or the like, which results in a lower manufacturing cost.

Since the outward takeout pump T can be disposed in the space A by the aforesaid construction, the axle driving apparatus can be used to drive external hydraulic instruments. Also, the oil filter is commonly usable between the charging pump C and outward takeout pump T, also lowering manufacturing costs.

What is claimed is:

1. An axle driving apparatus comprising,
a transmission case;
an L-shaped transmission support member housed within said transmission case;
a hydraulic pump mounted on said support member and communicating with an engine;
a hydraulic motor mounted on said support member and communicating with an axle;
a charging pump disposed on said support member, and driven by said hydraulic pump, said charging pump including a charging pump discharge oil passage in communication with a suction port provided in said support member, and a charging pump suction oil passage; and
an oil filter covering said charging pump suction oil passage.

2. The axle driving apparatus of claim 1 wherein said hydraulic pump is mounted to a horizontal surface of said L-shaped transmission support member.

3. The axle driving apparatus of claim 1 wherein said hydraulic motor is mounted to a vertical surface of said L-shaped transmission support member.

4. The axle driving apparatus of claim 1 wherein said charging pump is disposed on a lower horizontal surface of said transmission support member.

5. The axle driving apparatus of claim 1 further comprising,
a pair of check valves disposed within said support member fluid in a closed fluid circuit provided within said transmission support member.

6. The axle driving apparatus of claim 1, further comprising,
an outward takeout pump driven by said hydraulic pump disposed within said transmission case;
a takeout pump suction oil passage provided in said takeout pump in communication with said charging pump suction oil passage;
a takeout pump discharge oil passage provided in said takeout pump, in communication with an outward takeout port on said transmission case;
wherein said oil filter covers said charging pump suction oil passage and said takeout pump suction oil passage.

7. The axle driving apparatus of claim 6 wherein said outward takeout pump is disposed on a inner bottom surface of said transmission case.

8. The axle driving apparatus of claim 1, further comprising,
an outward takeout pump driven by said hydraulic pump;
a charging pump case for receiving said charging pump, fixed to said support member;
an outward takeout pump case for receiving said outward takeout pump, attached to said charging pump case;
a takeout pump suction oil passage disposed within said outward takeout pump and in communication with said charging pump suction oil passage;
wherein said oil filter covers said takeout pump suction oil passage and said charging pump suction oil passage; and
a takeout pump discharge oil passage disposed within said outward takeout pump and in communication with an outward takeout port on a surface of said transmission case.

9. The axle driving apparatus of claim 8 wherein said charging pump suction oil passage is open at a lower surface of said changing pump case and is covered by said oil filter.

10. An axle driving apparatus comprising,
a transmission case;
an L-shaped transmission support member housed within said transmission case;
a hydraulic pump mounted on said support member and communicating with an engine;
a hydraulic motor mounted on said support member and communicating with an axle;
a charging pump disposed on an inner surface of said transmission case, and driven by said hydraulic pump, said charging pump including a charging pump discharge oil passage in communication with a suction port provided in said support member, and a charging pump suction oil passage; and
an oil filter covering said charging pump suction oil passage.

11. The axle driving apparatus of claim 10 wherein said hydraulic pump is mounted to a horizontal surface of said L-shaped transmission support member.

12. The axle driving apparatus of claim 10 wherein said hydraulic motor is mounted to a vertical surface of said L-shaped transmission support member.

13. The axle driving apparatus of claim 10 wherein said charging pump is disposed on a lower surface of said transmission case.

14. The axle driving apparatus of claim 10 further comprising,
a pair of check valves disposed within said support member in a closed fluid circuit provided within said transmission support member.

15. The axle driving apparatus of claim 10 further comprising,
an outward takeout pump case disposed within said transmission case;
a charging pump case for receiving said charging pump fixed to said outward takeout pump case;

an outward takeout pump disposed within said outward takeout pump case, driven by said hydraulic pump and having a takeout pump suction oil passage and a takeout pump discharge oil passage, wherein said takeout pump suction oil passage is open at a lower surface of said charging pump case and is covered by said oil filter, and wherein said takeout pump suction oil passage is in communication with said charging pump suction oil passage; and an outward takeout port provided on said transmission case and connected to said takeout pump discharge oil passage.

* * * * *